(12) United States Patent
Ohtani

(10) Patent No.: US 9,153,962 B2
(45) Date of Patent: Oct. 6, 2015

(54) MOTOR CONTROL DEVICE AND IMAGING APPARATUS WITH IMPROVED POWER SOURCE STABILITY

(71) Applicant: Panasonic Corporation, Osaka (JP)

(72) Inventor: Yoshihiro Ohtani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/178,544

(22) Filed: Feb. 12, 2014

(65) Prior Publication Data

US 2014/0226057 A1    Aug. 14, 2014

(30) Foreign Application Priority Data

Feb. 13, 2013  (JP) ................................. 2013-025199

(51) Int. Cl.
*H02J 1/04* (2006.01)
*H02P 5/68* (2006.01)

(52) U.S. Cl.
CPC ... *H02J 1/04* (2013.01); *H02P 5/68* (2013.01); *Y10T 307/414* (2015.04)

(58) Field of Classification Search
CPC .......... H02P 5/68; H04N 5/23212; H02J 1/04

USPC .................................................. 348/357, 372
See application file for complete search history.

(56) References Cited

U.S. PATENT DOCUMENTS

| 2002/0018140 A1* | 2/2002 | Suemoto et al. | 348/372 |
| 2002/0071048 A1* | 6/2002 | Kaneda | 348/363 |
| 2005/0163501 A1* | 7/2005 | Miyakawa | 396/450 |
| 2005/0179782 A1* | 8/2005 | Endo | 348/207.99 |

FOREIGN PATENT DOCUMENTS

| JP | 63-70524 | 5/1988 |
| JP | 5-45567 | 2/1993 |
| JP | 2001-208956 | 8/2001 |
| JP | 2003-262904 | 9/2003 |
| JP | 2004-140955 | 5/2004 |
| JP | 2004-279709 | 10/2004 |
| JP | 2004-364418 | 12/2004 |

* cited by examiner

*Primary Examiner* — Gevell Selby
(74) *Attorney, Agent, or Firm* — Wenderoth, Lind & Ponack, L.L.P.

(57) ABSTRACT

A motor control device includes a DC motor, a power source configured to supply power to each of the DC motor and a load unit, and a controller configured to control power supply to the DC motor and the load unit. When reducing the power to be supplied to the DC motor, the controller increases the power to be supplied to the load unit during a predetermined period of time including a timing at which the power to be supplied to the DC motor is reduced.

5 Claims, 8 Drawing Sheets

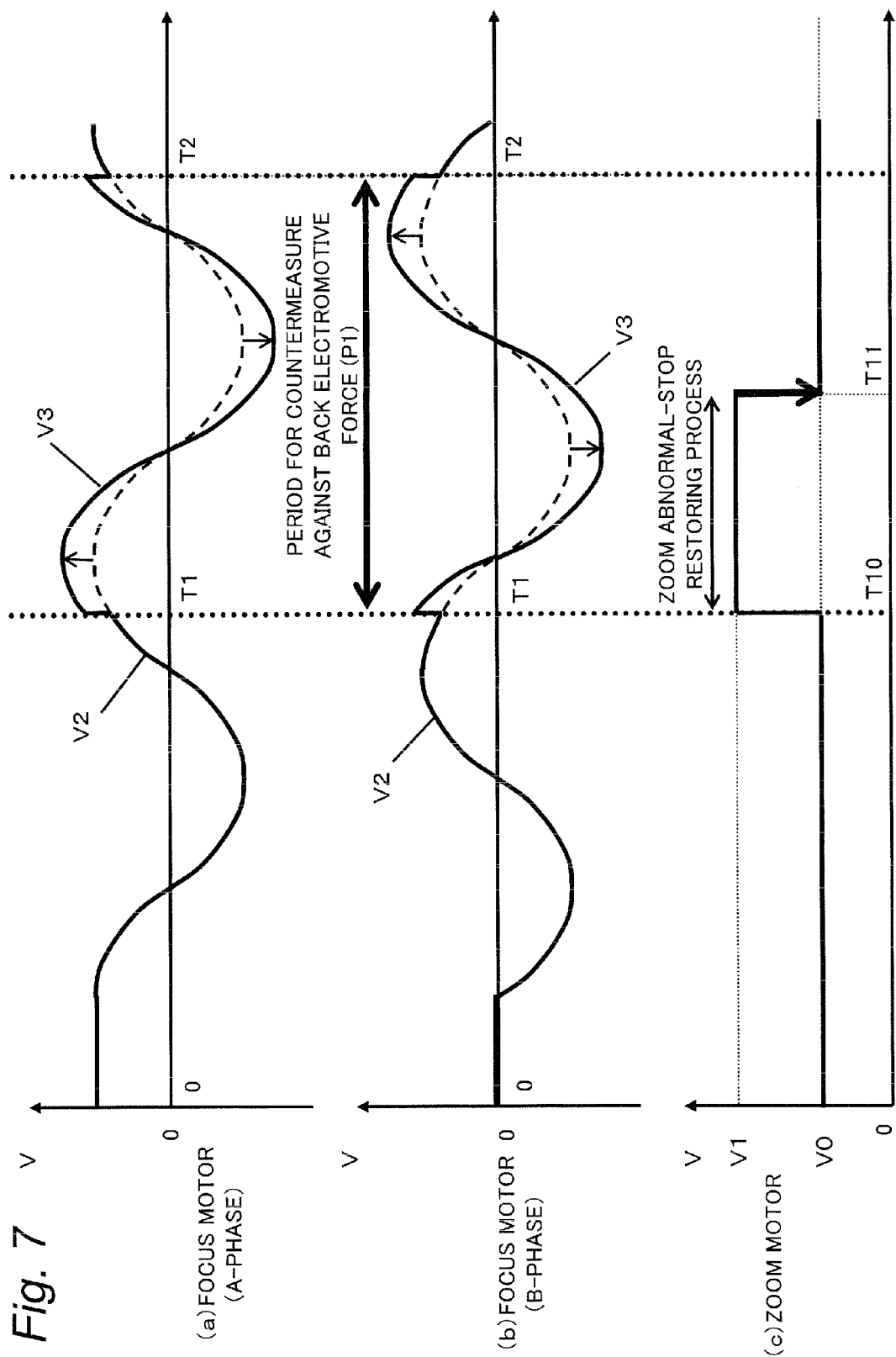

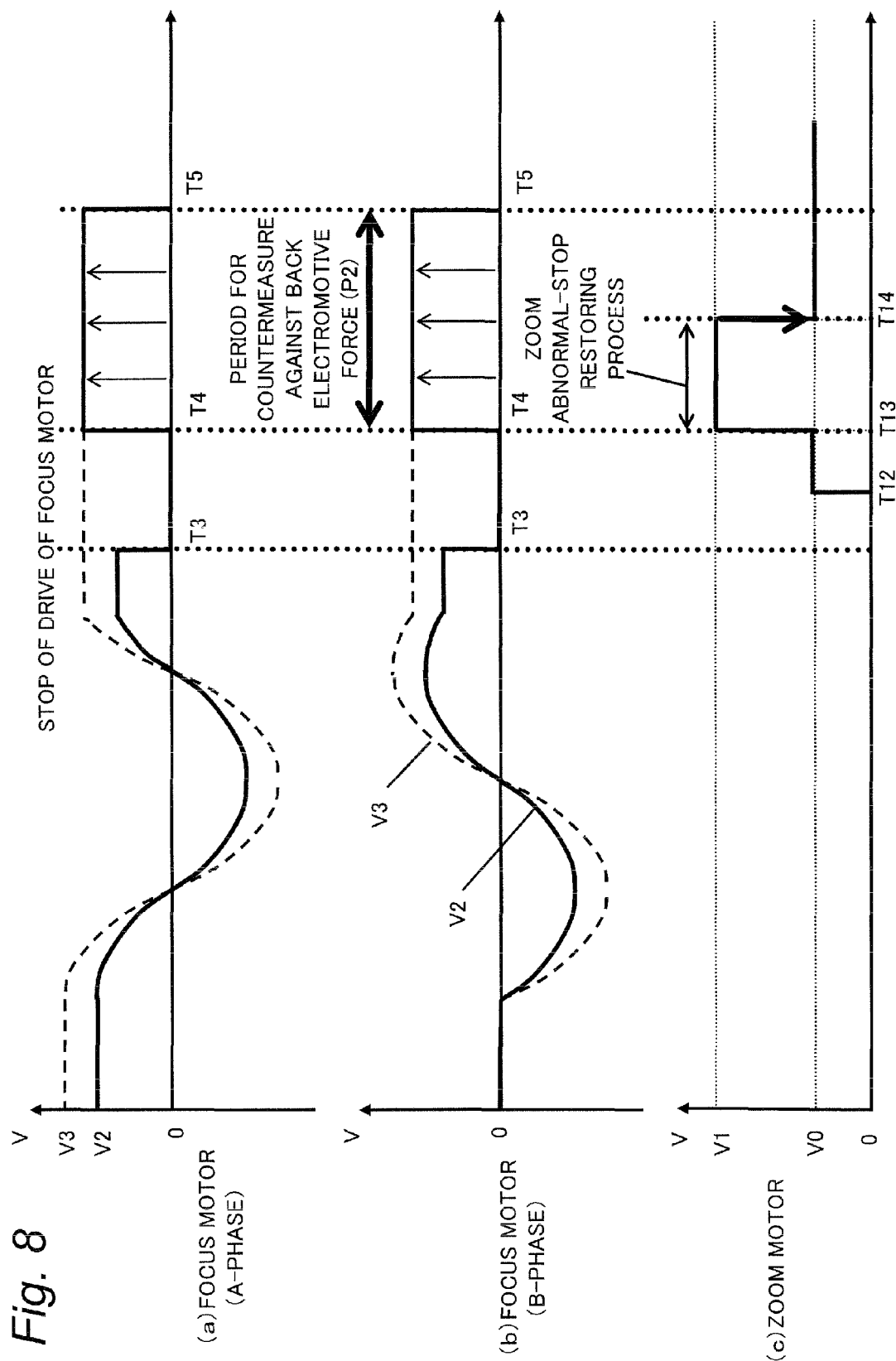

MOTOR CONTROL DEVICE AND IMAGING APPARATUS WITH IMPROVED POWER SOURCE STABILITY

BACKGROUND

1. Technical Field

The present disclosure relates to a motor control device for driving a unit to be driven by a DC (direct current) motor and an imaging apparatus using such a motor control device.

2. Related Art

A motor control device is known which drives a unit to be driven connected to a DC motor by controlling the DC motor and detects the position of the unit to be driven by counting the number of pulses generated by an encoder connected to the DC motor (refer to JP 2003-262904 A, for example).

For example, a digital camera provided with such a motor control device can adjust a field angle of a subject by moving a zoom lens along the optical axis direction by the DC motor. Moreover, the digital camera detects the position of the zoom lens by counting the number of pulses outputted from the encoder connected to the DC motor, and thus obtains information such as a zoom magnification.

SUMMARY

In general, in a DC motor, when a current supply is interrupted during a driving operation or when a drive voltage is abruptly dropped, a back electromotive force is generated. At this time, the generated back electromotive force gives adverse effects to a power source, with the result that operations of the entire apparatus might become unstable. For example, when a current caused by the back electromotive force reversely flows to the power source for controlling power supply to respective units, the operations of the power source become unstable. For this reason, the power supply from the power source to the respective units becomes unstable, and as a result, the operations of the entire apparatus might become unstable.

The present disclosure discloses maintaining operations of the entire apparatus stably in a motor controlling process using a DC motor even when a drive voltage is reduced.

A motor control device of the present disclosure includes a DC motor, a power source configured to supply power to each of the DC motor and a load unit, and a controller configured to control power supply to the DC motor and the load unit. When reducing the power to be supplied to the DC motor, the controller increases the power to be supplied to the load unit during a predetermined period of time including a timing at which the power to be supplied to the DC motor is reduced.

An imaging apparatus of the present disclosure includes: a first lens and a second lens; an imaging unit configured to capture a subject image incident through the first lens and the second lens to output image data; a DC motor configured to drive the first lens; a stepping motor configured to drive the second lens; a power source configured to supply power to each of the DC motor and the stepping motor; and a controller configured to control power supply to the DC motor and the stepping motor. When reducing the power to be supplied to the DC motor, the controller increases the power to be supplied to the stepping motor during a predetermined period of time including a timing at which the power to be supplied to the DC motor is reduced.

According to the motor control device of the present disclosure, it is possible to maintain operations of the Dower source stably in the motor controlling process using the DC motor even when the drive voltage to the DC motor is reduced.

BRIEF DESCRIPTION OF DRAWINGS

FIG. 7 is a view showing one example of a drive voltage to each of motors in a countermeasure against a back electromotive force according to the first embodiment.

FIG. 8 is a view showing another example of the drive voltage to each of the motors in the countermeasure against the back electromotive force according to the first embodiment.

DETAILED DESCRIPTION OF INVENTION

Hereinafter, embodiments will be described in detail with reference to the drawings as necessary. However, description in more detail than necessary may be omitted. For example, a detailed description of a well-known matter and a duplicate description of substantially the same configuration may be omitted. This is to prevent the following description from being unnecessarily redundant and to facilitate understanding of a person skilled in the art. It is to be noted that the inventor(s) provide the accompanying drawings and the following description in order for a person skilled in the art to fully understand the present disclosure, and the subject matter recited in the claims is not intended to be limited thereby.

First Embodiment

1. Configuration

Hereinafter, a configuration of a digital camera will be described with reference to the drawings. The digital camera of the present embodiment (one example of an electronic apparatus and an imaging apparatus) has an optical system including a zoom lens (one example of a unit to be driven) driven by a DC (direct current) motor. The digital camera can adjusts a field angle between a wide-angle end and a telephoto end by the operation of a zoom lever.

1-1. Configuration of Digital Camera

Figure 1:
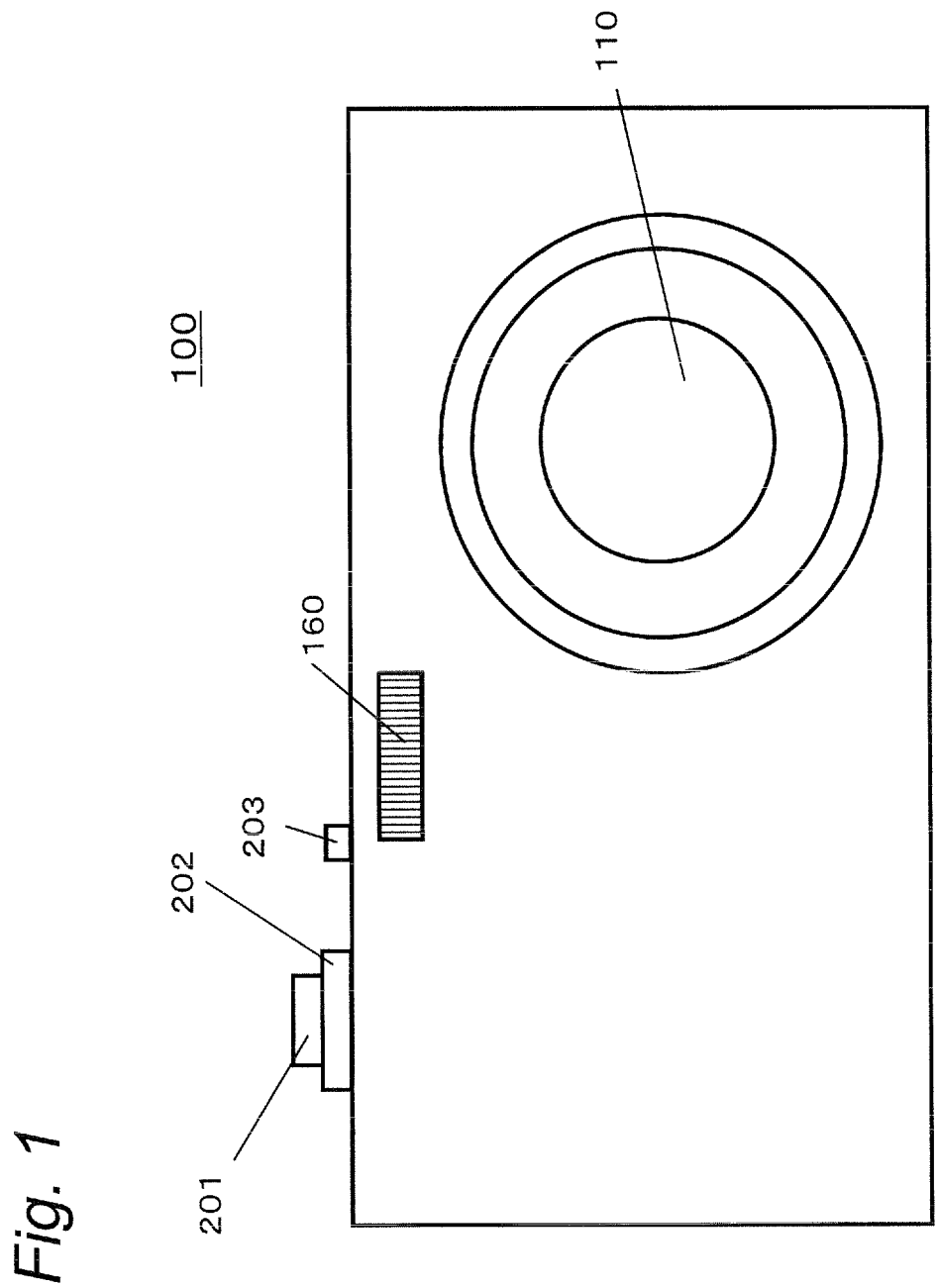
FIG. 1 is a front view of a digital camera according to a first embodiment.

FIG. 1 is a front view of a digital camera 100. The digital camera 100 has a lens-barrel for storing an optical system 110, and a flash 160 on its front surface. Moreover, the digital camera 100 has operation buttons such as a still image release button 201, a zoom lever 202, and a power button 203 on its upper surface.

Figure 2:
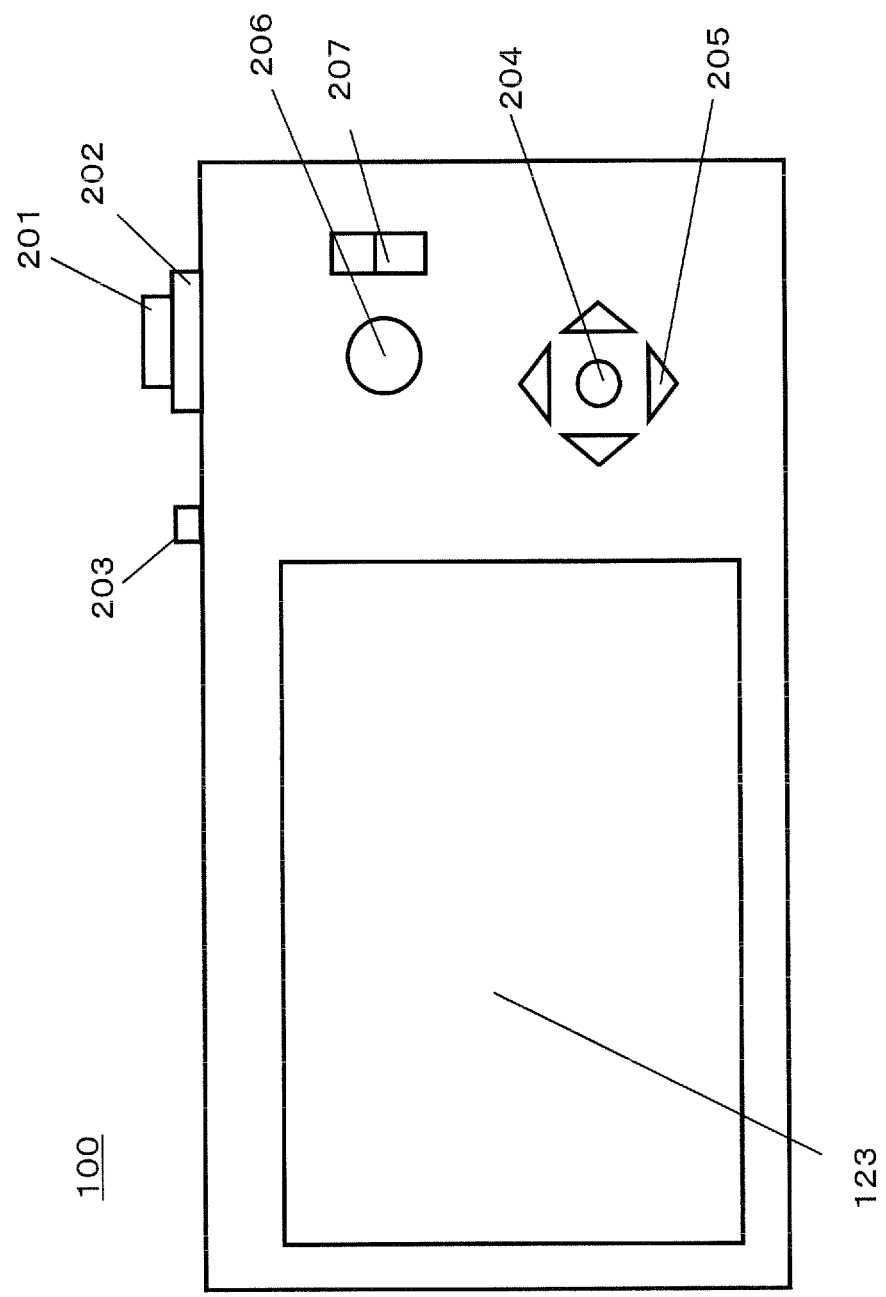
FIG. 2 is a rear view of the digital camera according to the first embodiment.

FIG. 2 is a rear view of the digital camera 100. The digital camera 100 has a liquid crystal monitor 123 and operation buttons such as a center button 204, cross buttons 205, a moving image release button 206, and mode changing-over switch 207 on its rear surface.

Figure 3:
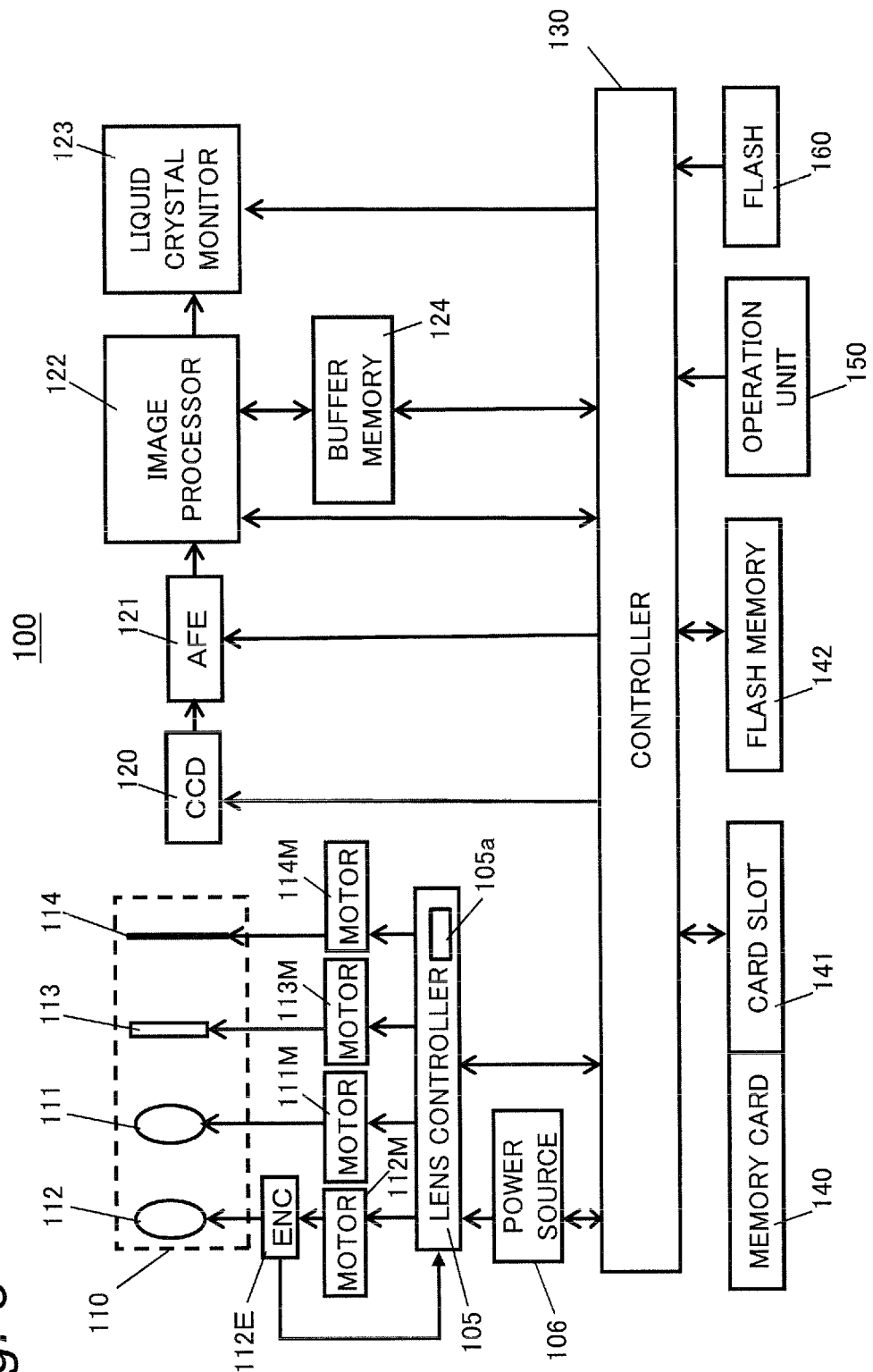
FIG. 3 is an electrical configuration diagram of the digital camera according to the first embodiment.

FIG. 3 is an electrical configuration diagram of the digital camera 100. The digital camera 100 captures a subject image formed via the optical system 110 by using a CCD image sensor 120. The CCD image sensor 120 generates image data based on the captured subject image. The image data generated by the capturing process is subject to various processes in AFE (Analog Front End) 121 and an image processor 122. The generated image data is recorded in recording media such as a flash memory 142 and a memory card 140. In the present embodiment, for example, a description will be given supposing that image data is recorded on the memory card 140. The image data recorded on the memory card 140 can be displayed on the liquid crystal monitor 123 in response to a user's operation on the operating unit 150. Details of respective constituent components shown in FIGS. 1 to 3 will be described below.

The optical system 110 includes a focus lens 111, zoom lens 112, a diaphragm 113, a shutter 114, and the like. Although not shown in the figure, the optical system 110 may include an optical camera shake correcting ((optical image stabilizer (OIS)) lens. Additionally, the respective lenses configuring the optical system 110 may include any number of lenses or any number groups of lenses.

The focus lens 111 is used for adjusting a focus state of a subject. The zoom lens 112 is used for adjusting a field angle of a subject. The diaphragm 113 is used for adjusting an amount of light incident on the CCD image sensor 120. The shutter 114 adjusts exposure time of the light incident on the CCD image sensor 120. The focus lens 111 is driven by a focus motor 111M (one example of a load unit). The zoom lens 112 is driven by a zoom motor 112M. The diaphragm 113 is driven by a diaphragm motor 113M. The shutter 114 is driven by a shutter motor 114M. The motors 111M to 114M are driven according to a control signal transmitted from a lens controller 105 (one example of a controller).

A DC motor is used as the zoom motor 112M. That is, the zoom motor 112M includes a motor magnet (not shown) and a motor coil (not shown), and by applying a DC voltage onto the motor coil under control of the lens controller 105, a rotary shaft is rotated. When the zoom motor 112M is rotated, a rotary encoder (hereinafter, referred to as an "encoder") 112E generates pulses in response to the rotation. The encoder 112E has a configuration of a generally-used rotary encoder including a light-emitting element, a light-receiving element, and a code wheel with a plurality of slits disposed with equal intervals. The code wheel rotates in conjunction with the rotation of the zoom motor 112M. The encoder 112E detects light emitted from the light-emitting element and transmitted through the slits of the code wheel by using the light-receiving element, and outputs the detection result as a pulse signal. The pulse generated by the encoder 112E is inputted to the lens controller 105, and the number of the pulses is measured by the lens controller 105.

The lens controller 105 drives the motors 111M to 114M according to instructions from a controller 130 to control the movements of the optical system 110. Moreover, the lens controller 105 includes a counter 105a, and counts the number of pulses generated by the encoder 112E using this counter 105a. Thereby, it is possible to detect the position of the zoom lens 112. The lens controller 105 may be implemented by a hard-wired electronic circuit or a microcomputer using a program, or the like. That is, the lens controller 105 may be implemented by a CPU, an MPU, an FPGA, a DSP, an ASIC, or the like. Moreover, the lens controller 105 may be implemented into a single semiconductor chip together with the controller 130 and the like.

A power source 106 supplies power required for driving the respective motors 111M, 112M, 113M and 114M of optical system 110 based on instructions from the controller 130. Additionally, although not shown in the figure, the power source 106 may also supply power to the other constituent components of the digital camera 100. The power source 106 configures a motor control device of the digital camera 100 together with the zoom motor 112M and the lens controller 105. The power source 106 is implemented by, for example, a power source IC.

The CCD image sensor 120 (one example of an imaging unit) captures a subject image formed through the optical system 110 to generate the image data. The CCD image sensor 120 can generate image data for new frame at every constant time when the digital camera 100 is in a shooting mode.

The AFE 121 performs noise repression by means of correlated double sampling, amplification to an input range width of an A/D converter by means of an analog gain controller, and A/D conversion by means of the A/D converter on the image data read from the CCD image sensor 120. Thereafter, the AFE 121 outputs the image data to the image processor 122.

The image processor 122 performs various processes to the image data outputted from the AFE 121. Examples of the various processes are, but not limited to, smear correction, white balance correction, gamma correction, a YC converting process, an electron zoom process, a compression process, and a decompression process. The image processor 122 stores image information subject to the various processes into a buffer memory 124. The image processor 122 may be implemented by a hard-wired electronic circuit or a microcomputer using a program or the like. Moreover, the image processor 122 may be implemented into a single semiconductor chip together with the controller 130 and the like.

The liquid crystal monitor 123 is provided to the rear surface of the digital camera 100. The liquid crystal monitor 123 displays images based on the image data processed by the image processor 122. The images to be displayed by the liquid crystal monitor 123 include a through image or a recorded image. The through image is an image to be continuously displayed based on image data for new frames, which are generated by the CCD image sensor 120 at every constant time. Normally, when the digital camera 100 is in the shooting mode, the image processor 122 generates the through image based on the image data generated by the CCD image sensor 120. By referring to the through image displayed on the liquid crystal monitor 123, a user can photograph a subject while checking a composition of the subject. The recorded image is an image generated by reducing a large number of pixels to a small number of pixels in order to display image data with the large number of pixels recorded on the memory card 140 on the liquid crystal monitor 123, when the digital camera 100 is in a reproducing mode. The image data with the large number of pixels to be recorded in the memory card 140 is generated by the image processor 122 based on the image data generated by the CCD image sensor 120 when the release button is operated by the user, and recorded in the memory card 140.

The controller 130 may be implemented by a hard-wired electronic circuit or a microcomputer or the like. Moreover, the controller 130 may be implemented into a single semiconductor chip together with the image processor 122 or the like. The controller 130 includes a ROM for storing control programs. The ROM may be provided to the inside or the outside of the controller 130. That is, the controller 130 may be implemented by a CPU, an MPU, an FPGA, a DSP, an ASIC, or the like.

The buffer memory 124 is a storage unit that functions as work memories of the image processor 122 and the controller 130. The buffer memory 124 can be implemented by a DRAM (Dynamic Random Access Memory) or the like. Moreover, the flash memory 142 functions as an internal memory for recording the image data and setting information or the like of the digital camera 100.

A card slot 141 is a connecting unit for mounting the memory card 140 to the digital camera 100. The card slot 141 can be electrically and mechanically connected to the memory card 140. Moreover, the card slot 141 may have a function for controlling the memory card 140.

The memory card 140 is an external memory having a storing element such as a flash memory therein. The memory card 140 can record data such as image data to be processed by the image processor 122.

The operation unit 150 is a generic term representing operation buttons and operation dials provided to an exterior of the digital camera 100 and receives operations by the user. Examples of the operation unit 150 include the still image release button 201, the moving image release button 206, the zoom lever 202, the power button 203, the center button 204, the cross buttons 205, and the mode changing-over switch 207 shown in FIG. 1 and FIG. 2. Upon receipt of an operation by the user, the operation unit 150 transmits various operation instructing signals to the controller 130.

The still image release button 201 is a push button with two stages of a half-press state and a full-press state. When the still image release button 201 is half-pressed by the user, the controller 130 performs an AF (Auto Focus) control and/or an AE (Auto Exposure) control to determine a shooting condition. Subsequently, when the still image release button 201 is full pressed by the user, the controller 130 executes the shooting process. The controller 130 records image data captured at the full-press timing as the still image in the memory card 140 or the like. Hereinafter, the description that the still image release button 201 is pressed down merely means the full-press.

The moving image release button 206 is a push button for instructing start/completion of recording of the moving images. When the moving image release button 206 is pressed down by the user, the controller 130 starts a recording operation of the moving images. That is, the controller 130 sequentially records the image data generated by the image processor 122 based on the image data generated by the CCD image sensor 120, as a moving image in the recording medium such as the memory card 140. When the moving image release button 206 is again pressed down, the controller 130 completes the recording operation of the moving image.

The zoom lever 202 is a lever of a center-position self-returning type lever for adjusting the field angle between the wide-angle end and the telephoto end. When the zoom lever 202 is operated by the user, the controller 130 detects this operation to transmit an instruction for driving the zoom lens 112 to the lens controller 105. That is, when the zoom lever 202 is operated to a side of the wide-angle end, the controller 130 transmits an instruction for driving the zoom lens 112 to the lens controller 105 to capture a subject at a wider angle. Similarly, when the zoom lever 202 is operated to a side of the telephoto end, the controller 130 transmits an instruction for driving the zoom lens 112 to the lens controller 105 to capture a subject at the telephoto end. Upon completion of the operation of the zoom lever 202, the controller 130 transmits an instruction for stopping the driving operation of the zoom lens 112 to the lens controller 105.

The power button 203 is a push button for allowing the user to instruct power supply to the respective units configuring the digital camera 100. When the power button 203 is pressed down by the user in a power-off state, the controller 130 supplies power from the power source 106 to the respective units configuring the digital camera 100 to activate the digital camera 100. Moreover, when the power button 203 is pressed down by the user in a power-on state, the controller 130 stops the power supply from the power source 106 to the respective units.

The center button 204 is a push button. When the center button 204 is pressed down by the user while the digital camera 100 is in the shooting mode or the reproducing mode, the controller 130 displays a menu screen on the liquid crystal monitor 123. The menu screen is a screen for setting various conditions for the shooting/reproduction process. Information set on the menu screen is recorded in the flash memory 142. When being pressed down in a state that setting items of the various conditions are selected, the center button 204 also functions as a determination button.

The cross buttons 205 are push buttons provided to up, down, right and left directions. By pressing the cross button 205 in any one of the directions, the user is allowed to select the various condition items displayed on the liquid crystal monitor 123.

The mode changing-over switch 207 are push buttons provided to up and down directions. By pressing down either one of the directions of the mode changing-over switch 207, the user is allowed to change the mode of the digital camera 100 to the shooting mode or the reproducing mode.

2. Operation 2-1. Shooting Operation of Digital Camera

Figure 4:
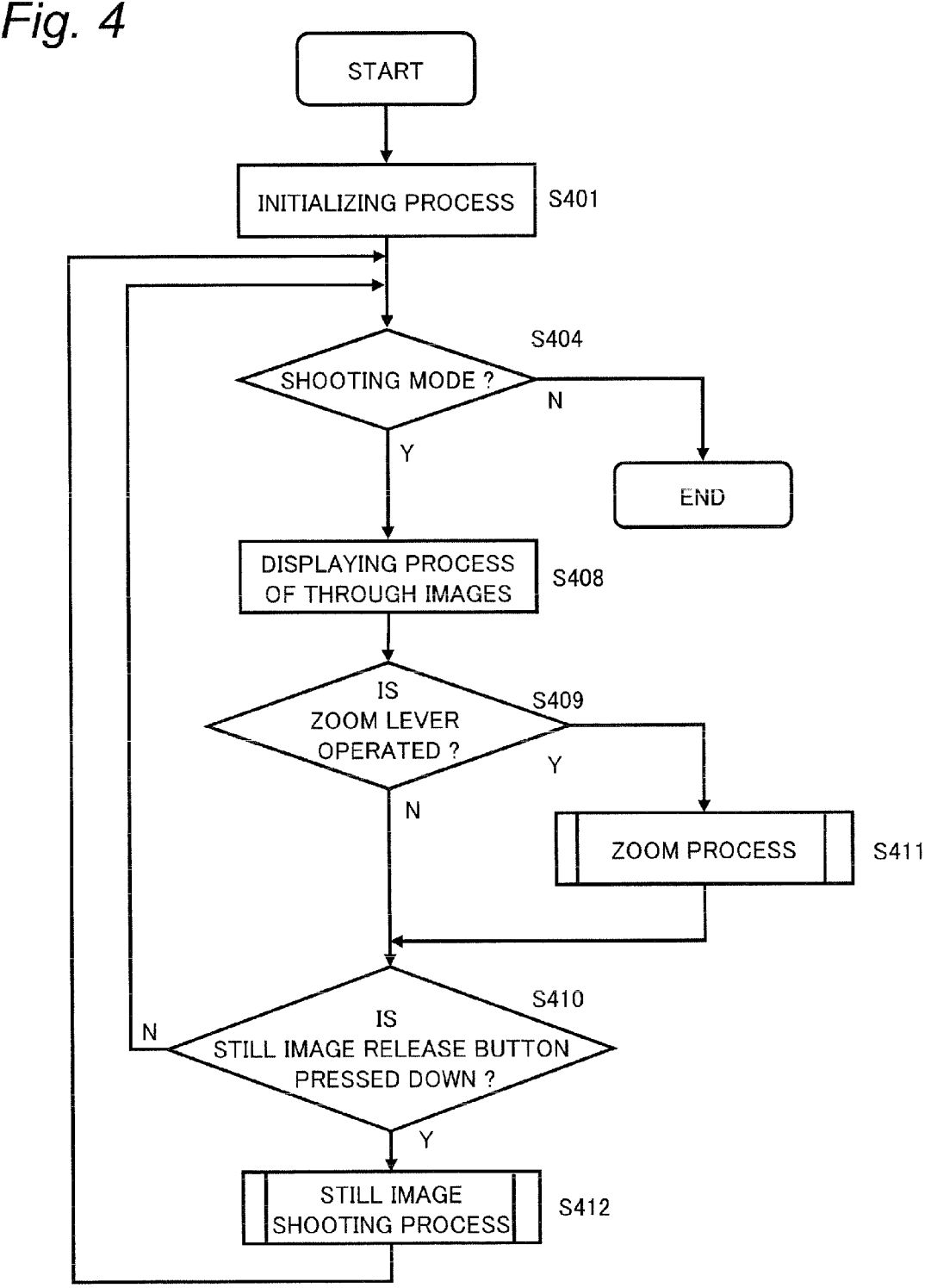
FIG. 4 is a flowchart showing a flow of process in a shooting mode according to the first embodiment.

A description will be given of control processes of the digital camera 100 in the shooting mode. The digital camera 100 can record the shot image data. FIG. 4 is a flowchart showing control processes relating to image shooting operations of the digital camera 100 in the shooting mode. The digital camera 100 can perform an image shooting operation of a moving image and a still image in the shooting mode, and the following description will be given of the operations in shooting of a still image for convenience of description.

When the user operates the mode changing-over switch 207 so that the digital camera 100 proceeds to the shooting mode, the controller 130 executes an initializing process necessary for recording the still image (S401).

The controller 130 repeats an input confirming process from the user and a display process which include a step of confirming a state of the mode changing-over switch 207 (S404), a step of displaying through images (S408), a step of monitoring an operation of the zoom lever (S409), and a step of monitoring a pressing down of the still image release button 201 (S410). At this time, when the state of the mode changing-over switch 207 is not in the shooting mode (No in step S404), the process in the shooting mode shown in FIG. 4 is completed.

In the case of the shooting mode, the controller 130 executes a displaying process of through images based on set values relating to the display currently set (S408). Thereafter, the controller 130 monitors the presence or absence of an operation of the zoom lever 202 (S409). Lon detention of the operation of the zoom lever 202, the controller 130 transmits an instruction based on the zoom lever operation to the lens controller 105. Based on the instruction, the lens controller 105 executes a zoom process (S411). The description of this zoom process will be given later in detail.

Thereafter, the controller 130 monitors the pressing down of the still image release button 201 (S410). Upon detection of the pressing down of the still image release button 201 (YES in step S410), the controller 130 executes a still image shooting process (S412). When no pressing down of the still image release button 201 is detected (NO in step S410), the controller 130 repeatedly executes the processes of steps S404 to S411. Moreover, upon completion of the still image shooting process (S412), the controller 130 returns to step S404, and executes the above-mentioned processes repeatedly.

2-1-1. Zoom Process

Figure 5:
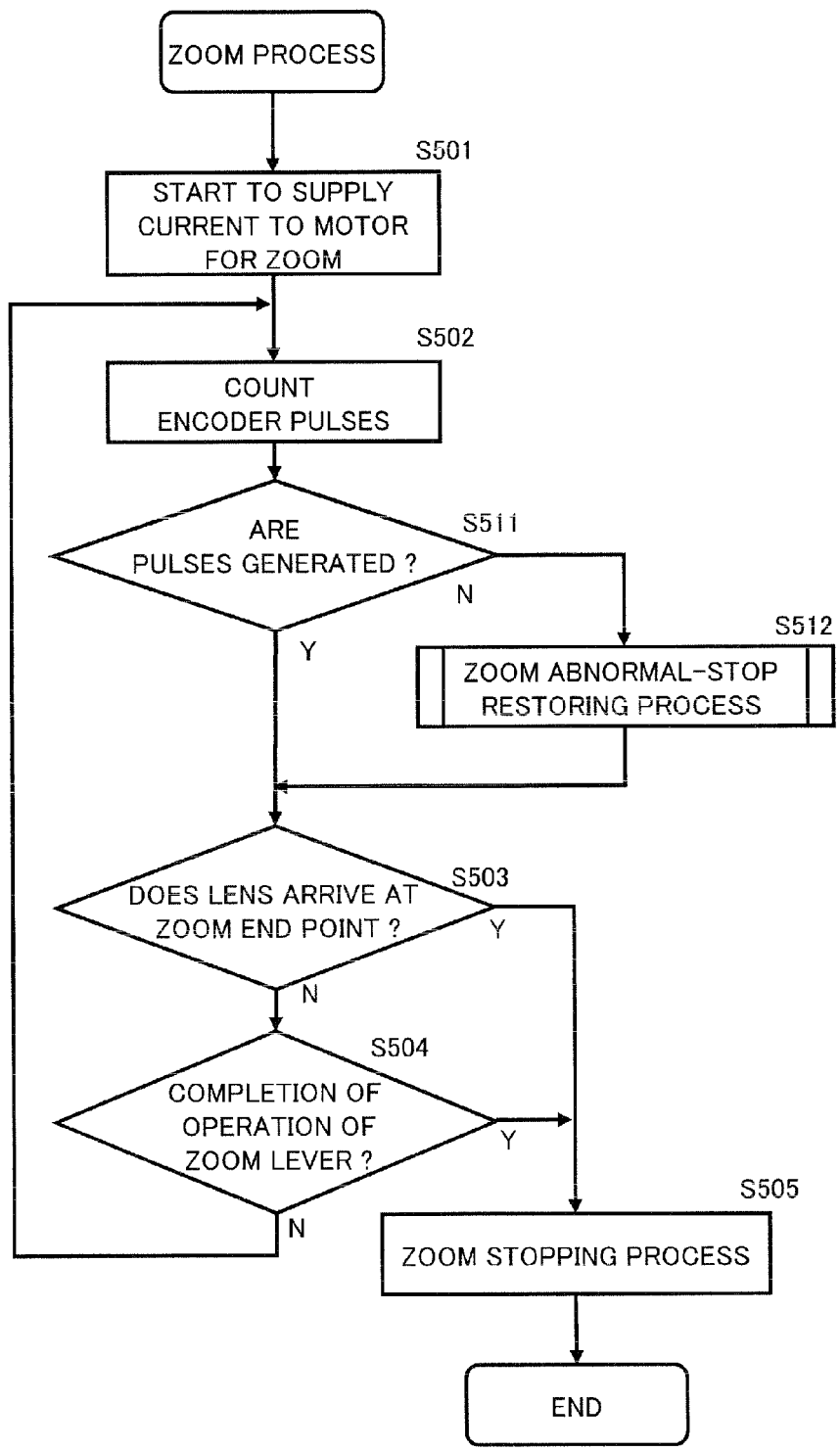
FIG. 5 is a flowchart showing a zoom process according to the first embodiment.

The zoom process (S411) in FIG. 4 will be described in detail. FIG. 5 is a flowchart showing the details of the zoom process (S411) in FIG. 4.

Upon detection of an operation of the zoom lever 202 by the user, the controller 130 instructs the lens controller 105 to drive the zoom lens 112 toward an operated direction angle/telephoto direction). Upon receipt of this instruction, the lens controller 105 starts to apply a current to the zoom motor 112M to rotate the motor in a rotation direction corresponding to the zooming operated direction (wide angle/telephoto direction) (S501). The lens controller 105 counts the number of pulses of the encoder 112E generated by the rotation of the zoom motor 112M to measure the position of the zoom lens 112 (S502).

In this case, the lens controller 105 determines whether the pulses of the encoder 112E are generated by the rotation of the zoom motor 112M (S511). In the case where no pulse generation is detected by the lens controller 105, it is considered that the zoom motor 112M (that is, the zoom lens 112) is abnormally stopped. Therefore, when no pulse generation is detected, the lens controller 105 executes a zoom abnormal-stop restoring process (S512). This zoom abnormal-stop restoring process will be described later in detail.

On the other hand, when the pulse generation is detected, the lens controller 105 determines whether the zoom lens 112 has arrived at the wide-angle end or the telephoto end based on the counted value of the encoder pulses (S503). When the zoom lens 112 has arrived at the wide-angle end or the telephoto end (hereinafter, referred to as "end point"), the lens controller 105 executes a zoom stopping process (S505). The determination of whether the zoom lens 112 has arrived at the end point can be implemented, for example, by preliminarily storing a value of the counter (reference value) at the time at which the zoom lens 112 is located at each of the wade angle end telephoto end, and by determining whether the counter value is coincident with the reference value. Moreover, the lens controller 105 informs the controller 130 of the fact that the zoom lens 112 has arrived at the end point.

When the zoom lens 112 has not arrived at the end point, the controller 130 further determines whether the operation of the zoom lever 202 has been completed (S504). When the operation of the zoom lever 202 has been completed, the controller 130 instructs the lens controller 105 to execute a zoom stopping process, and the lens controller 105 executes a short braking process on the zoom motor 112M to stop the zoom lens 112 at a target position (S505).

On the other hand, when the operation of the zoom lever 202 has not been completed, the controller 130 and the lens controller 105 execute a sequence of processes from step S502 repeatedly.

2-1-2. Zoom Abnormal-Stop Restoring Process

Figure 6:
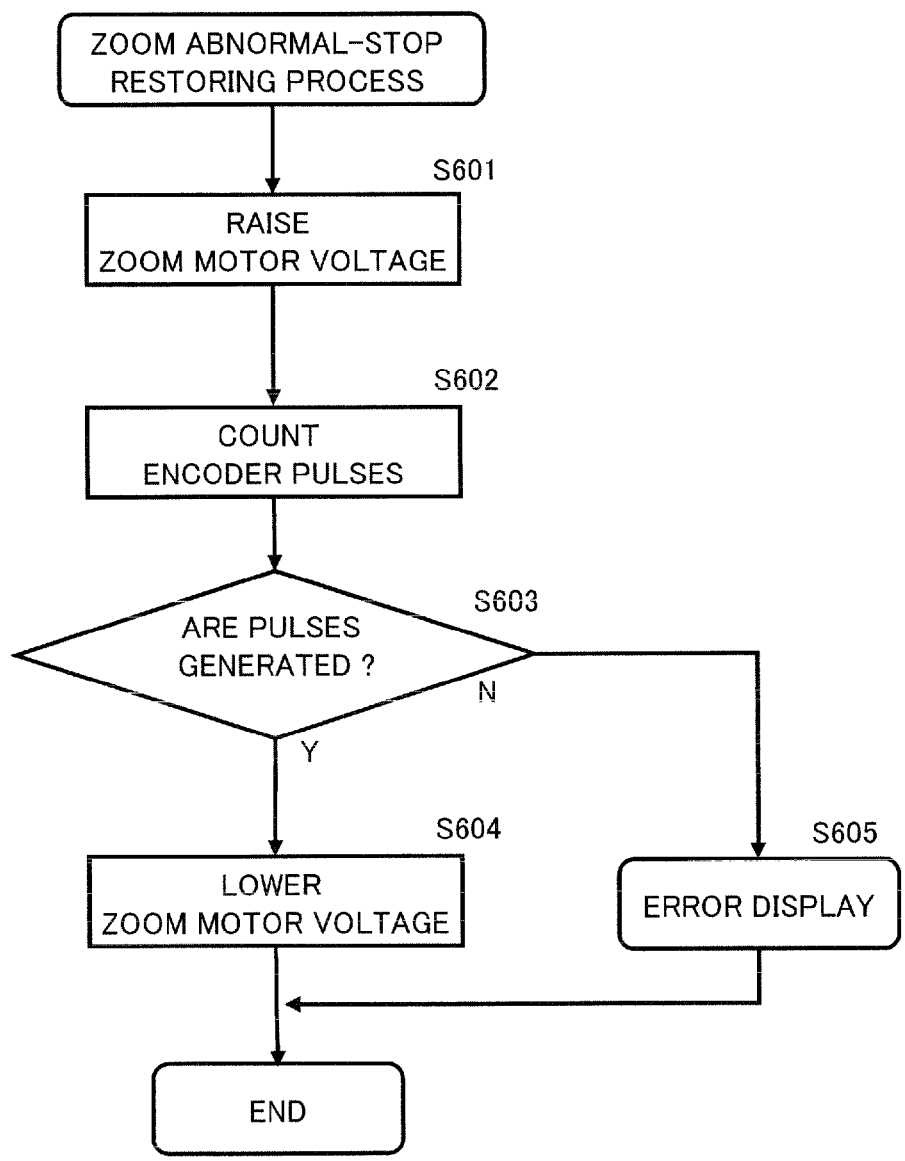
FIG. 6 is a flowchart showing a zoom abnormal-stop restoring process according to the first embodiment.

Next, referring to a flowchart of FIG. 6, a description will be given below of the details of the zoom abnormal-stop restoring process (S512) in the flow of FIG. 5. FIG. 6 is a flowchart showing the details of the zoom abnormal-stop restoring process (S512).

No pulse is generated by the encoder 112E in spite of application of a current onto the zoom motor 112M by the lens controller 105, there is a possibility of stoppage of the zoom motor 112M caused by an insufficient driving torque under a low temperature environment or the like. In this case, by raising the voltage to be applied to the zoom motor 112M to increase the driving torque of the zoom motor 112M, the motor in stoppage can be started to rotate.

For this reason, in order to restore the zoom motor 112M from the abnormally stopped state, the lens controller 105 raises the voltage to be applied to the zoom motor 112M (that is, increases the power to be supplied to the zoom motor 112M) (S601). Thereafter, the lens controller 105 counts the encoder pulses (S602), thereby determining whether pulses are generated (S603).

When the pulses are generated, the voltage of the zoom motor 112M is lowered to the original voltage (the power to be supplied is reduced to the original power) (S604), and the zoom abnormal-stop restoring process is completed. In contrast, when no pulses are generated, since the stoppage may be caused by a reason other than the above-mentioned reason (S605), an error display is given onto the liquid crystal monitor 123, and the present process is completed.

2-2. Countermeasures Against Back Electromotive Force

As described above, the zoom motor 112M is configured by a DC motor. For this reason, when the lens controller 105 lowers the drive voltage of the zoom motor 112M in step S604, the zoom motor 119M generates a back electromotive force due to characteristics of the DC motor. This back electromotive force flows into the power source 106. When the back electromotive force flows into the power source 106, a protective function for stopping the power supply or the like is sometimes exerted for the sake of maintaining safety. The operation of the power source 106 becomes unstable because of this protective function to cause instability of the power supply to the respective units, with the result that the entire operations of the digital camera 100 might become unstable.

In order to solve the problems caused by this back electromotive force, in the present embodiment, the power source 106 is allowed to supply power greater than a back electromotive force flowing into the power source 106 from the zoom motor 112M (DC motor) at the timing at which the generation of a back electromotive force is expected in the zoom motor 112M. This arrangement prevents the power supply from becoming unstable.

More specifically, in the digital camera 100 of the present embodiment, when the voltage of the zoom motor 112M is lowered (power to be supplied is reduced) in step S604, the other motors that receives power supply from the same power source 106 is allowed to consume power that is originally unnecessary. Thus, the power source 106 is prevented from becoming unstable (hereinafter, this control is referred to as "countermeasures against back electromotive force").

A description will be given below of the countermeasures against back electromotive force, on the assumption that another motor that receives the power supply from the power source 106 together with the zoom motor 112M is the focus motor 111M, 2-2-1. Countermeasures Against Back Electromotive Force During Tracking Drive Operation Referring to FIG. 7, a description will be given of the countermeasures against back electromotive force by means of the focus motor 111M that is tracking-driven during a zoom process. The tracking refers to an adjusting operation of the position of the focus lens 111 performed in conjunction with the shift of the zoom lens 112 to adjust (compensate) a shifted focal point caused by the shift of the zoom lens 112. Therefore, in the tracking drive operation, in order to adjust (compensate) the shifted focal point caused by the shift of the zoom lens 112 performed by driving the zoom motor 112M, the focus motor 111M is driven in conjunction with the shift of the zoom lens 112. Additionally, in the following description, it is supposed that the focus motor 111M is a two-phase stepping motor having an A-phase and a B-phase, which is controlled by a micro-step driving operation in which a sinusoidal wave voltage is applied to each of the A-phase and B-phase. The voltage of the stepping motor in the micro-step driving operation is defined by the amplitude of the sinusoidal wave that is applied thereto, and the position of the motor is defined by a combination of the phases of the sinusoidal waves of the A-phase and the B-phase. Part (a) of FIG. 7 is a diagram showing a time-based change in the motor voltage to be applied to the A-phase of the focus motor MM. Part (b) of FIG. 7 is a diagram showing a time-based change in the motor voltage to be applied to the B-phase of the focus motor 111M. Part (c) of FIG. 7 is a diagram showing a time-based change in the motor voltage to be applied to the zoom motor 112M.

In parts (a) to (c) of FIG. 7, first, suppose that during a process in which the lens controller 105 is driving the zoom motor 112M at a voltage V0, for a tracking drive operation, the lens controller 105 applies a voltage V2 having a sinusoidal wave to the A-phase and B-phase of the focus motor 111M, as shown in parts (a) and (b) of FIG. 7, to drive the focus motor 111M. In this case, suppose that at time T10, a zoom abnormal-stop restoring process takes place as shown in part (c) of FIG. 7. The lens controller 105 raises the voltage of the zoom motor 112M to V1 (S601) when the zoom abnormal-stop restoring process starts, and lowers the voltage to V0 at time T11 after a predetermined period of time (S604). When the voltage of the zoom motor 112M is lowered from V1 to V0, a back electromotive force is generated. Therefore, at time T1 corresponding to a timing before time T11 at which the voltage of the zoom motor 112M is lowered, the lens controller 105 raises only the amplitude of the voltage to be applied to the A-phase and B-phase of the focus motor 111M to predetermined voltage V3, with the phase thereof being unchanged. The value of the predetermined voltage V3 is set to a value within a range not exceeding a predetermined voltage value (upper limit value) that is determined by the specification of the power source 106. The lens controller 105 increases the amplitude of the voltage to be applied to the focus motor 111M to the predetermined value during a predetermined period of time.

Raising of the applied voltage to the focus motor 111M causes a current (that is, power) to be supplied from the power source 106 to increase. The voltage V3 that is to be raised is set to cause the amount of this raised current (power) to be greater than a current (power) that reversely flows to the power source 106 by the back electromotive force. Thus, the amount of current to be supplied from the power source 106 is prevented from becoming a negative value, and the operation of the power source 106 is consequently prevented from becoming unstable by the back electromotive force. At this time, although the power consumption of the focus motor 111M is raised, since the phase of the motor voltage (control signal) being applied is the same as that in the case where no countermeasures against back electromotive force are exerted, no influences are caused to the operation of the focus motor 111M.

Thereafter, at time T2 corresponding to a timing at which the back electromotive force generated by the fact that the voltage of the zoom motor 112M is lowered from V1 to V0 is supposed to be sufficiently converged, the voltage of the focus motor 111M is lowered to V2.

2-2-1. Countermeasures Against Back Electromotive Force During Motor Stoppage

Referring to FIG. 8, a description will be given of countermeasures against back electromotive force by means of the resting focus motor 111M. Additionally, in the same manner as in FIG. 7, suppose that the focus motor 111M is a stepping motor in a micro-step driving operation having two phases of an A-phase and a B-phase. Additionally, in the following example, suppose that no tracking drive operation of the focus lens 111 according to the shift of the zoom lens 112 is executed.

As shown in parts (a) and (b) of FIG. 8, in a state where the lens controller 105 drives the focus motor 111M, the lens controller 105 stops the current supply to the focus motor 111M at time T3 to stop the driving operation of the focus motor 111M. Next, as shown in part (c) of FIG. 8, at time T12, the lens controller 105 starts driving the zoom motor 112M with a voltage V0. As described earlier, in this example, suppose that no tracking drive operation of the focus lens 111 according to the shift of the zoom lens 112 is performed. In this case, at time T13, suppose that a zoom abnormal-stop restoring process takes place. When the zoom abnormal-stop restoring process is started, the lens controller 105 raises the voltage of the zoom motor 112M to V1 (S601), and lowers the same to V1 at time T14 (S604).

since a back electromotive force is generated when the voltage of the zoom motor 112M is lowered from V1 to V0, as shown in parts (a) and (b) of FIG. 8, at time T4 corresponding to a timing before time T14, the lens controller 105 applies a predetermined voltage V3 to the A-phase and B-phase of the focus motor 111M, with the same phase as that at the point of time T3 being set, thereby preventing the power source 106 from becoming unstable due to the back electromotive force. At this time, although the power consumption of the focus motor 111M is raised, since the phase of the applied voltage is the same as that at the time of T3, the focus motor 111M is unchanged from the position of the stoppage at time T3 (that is, the step position of the stepping motor is unchanged). Thereafter, at time T5 corresponding to a timing at which the back electromotive force generated by the fact that the voltage of the zoom motor 112M is lowered from V1 to V0 is supposed to be sufficiently converged, the current supply to the focus motor 111M is completed.

As described above, during a predetermined period of time (period P1 in the example of parts (a) to (c) of FIG. 7 and period P2 in the example of parts (a) to (c) of FIG. 8) including the timing at which an applied voltage to the zoom motor 112M is lowered (time T11 in the example of parts (a) to (c) of FIG. 7 and time T14 in the example of parts (a) to (c) of FIG. 8), the voltage to be applied to the focus motor 111M that receives power supply from the same power source 106 as that of the zoom motor 112M is raised. Thus, it is possible to eliminate influences of a back electromotive force caused by the reduction of the applied voltage to the zoom motor 112M against the power source 106, and consequently to provide stable operations of the power source 106.

3. Conclusion

As described above, the motor control device of the digital camera 100 of the present embodiment includes the zoom motor 112M (one example of a DC motor), the power source 106 configured to supply power to each of the zoom motor 112M and the focus motor 111M (examples of a load unit), and the lens controller 105 configured to control power supply to the zoom motor 112M and the focus motor 111M. When reducing the power to be supplied to the zoom motor 112M, the lens controller 105 increases the power to be supplied to the focus motor 111M during the predetermined period (period P1 in the example of parts (a) to (c) of FIG. 7 and period P2 in the example of parts (a) to (c) of FIG. 8) including a timing at which the power to be supplied to the zoom motor 112M is reduced.

As described above, prior to reducing the power to be supplied to the zoom motor 112M, the lens controller 105 controls the focus motor 111M that receives power supply from the power source 106 to consume power that is originally unnecessary. Thus, the operation of the power source 106 is prevented from becoming unstable by a back electromotive force generated due to a reduction of the applied voltage to the zoom motor 112M.

With this structure, the digital camera 100 can keep the operations of the entire apparatus stable even when the drive voltage of the zoom motor 112M is lowered.

4. Other Embodiments

As described above, the first embodiment is described as an exemplary arts disclosed by the present application. However, not limited by this, the arts of the present disclosure may be applied to other embodiments in which modifications, replacements, additions, omissions, or the like are made as necessary. Moreover, by combining the respective constituent components described in the first embodiment with one another, new embodiments may be made. Other embodiments will be exemplified below.

The above-mentioned embodiment exemplifies the focus motor 111M using a stepping motor with two phases as a load unit for use as countermeasures against the back electromotive force. Since the focus motor 111M serving as the load unit is only necessary to consume power that is only required to cancel the back electromotive force, another stepping motor having a structure other than the two-phase structure may be used. Moreover, the load unit may be not necessarily prepared as the stepping motor. For example, examples of the other load units include the diaphragm motor 113M and the shutter motor 114M to which power is supplied from the same power source 106 as that of the zoom motor 112M. Then, in countermeasures against the back electromotive force, the applied voltage to the diaphragm motor 113M and the shutter motor 114M may be changed.

In the above-mentioned embodiment, the structure for the countermeasures against back electromotive force is described by exemplifying the embodiment using the zoom abnormal-stop restoring process; however, the idea of the present disclosure may be applied to another structure other than the zoom abnormal-stop restoring process. That is, the idea of the present disclosure may be applied to a power source control for use in a reducing control of the applied voltage to the zoom motor 112M having a possibility of causing a generation of back electromotive force.

In the above-mentioned embodiment, the structure of a digital camera having a built-in optical system is described; however, the idea of the above-mentioned embodiment may be applied to a lens-exchanging type camera. In this case, the interchangeable lens (that is, lens mirror barrel) includes an optical system as shown in the above-mentioned embodiment, a motor for driving the optical system, an encoder for measuring the number of revolutions of the motor, and a lens controller for controlling the respective units inside the interchangeable lens. Then, the lens controller may execute the controlling operation as described in the above-mentioned embodiment.

In the above-mentioned embodiment, the descriptions are given by exemplifying a DC motor as a motor having a possibility of generating a back electromotive force; however, the idea of the power source control of the present disclosure may be applied to a motor other than the DC motor. For example, the idea of the power source control of the present disclosure may be applied to the case of using a motor such as a moving magnet motor having a possibility of generating a back electromotive force as a driving unit.

In the above-mentioned embodiment, the descriptions are given by exemplifying a zoom lens as a driving target of the DC motor; however, the idea of the power source control of the present disclosure can be applied to the case of using another member as the driving target.

In the above-mentioned embodiment, the descriptions are given by exemplifying a digital camera as an electronic apparatus provided with the motor control device; however, the idea of the power source control of the present disclosure may be applied to any apparatus as far as the apparatus (electronic apparatus, industrial machine, or the like) uses a DC motor for driving the unit to be driven. For example, the idea of the power source control of the present disclosure may be applied to the driving control of a DC motor for use in robots. That is, the idea of the power source control of the present disclosure may be applied to general motor controls using a DC motor.

As described above, the embodiments are described as exemplary arts in the present disclosure. For this purpose, the accompanying drawings and detailed descriptions are provided.

Therefore, among constituent components described in the accompanying drawings and detailed descriptions, not only the constituent components that are essential for solving the problems, but also constituent components that are not necessarily essential for solving the problems may be included for exemplifying the above-mentioned arts. For this reason, based on the accompanying drawings and detailed description in which those constituent components that are not necessarily essential are described, it should not be directly recognized that those constituent components that are not necessarily essential might be essential.

Moreover, since the above-mentioned embodiments are used only for exemplifying the arts of the present disclosure, the embodiments may be subject to various modifications, replacements, additions, omissions, or the like within the scope of the claims and the scope of their equivalence.

According to the present disclosure, it is possible to keep operations of the entire apparatus stable even when a drive voltage is lowered in a motor control device using a DC motor. Therefore, the idea of the present disclosure is also applicable to a digital still camera, a movie camera, a portable telephone, a smart phone, a mobile PC, a robot, or the like.

What is claimed is:

1. A motor control device comprising:
    a DC motor;
    a power source configured to supply power to each of the DC motor and a load unit; and
    a controller configured to control power supply to the DC motor and the load unit, wherein
    when reducing the power to be supplied to the DC motor, the controller increases the power to be supplied to the load unit during a predetermined period of time which starts before a timing at which the power to be supplied to the DC motor is reduced and ends after the timing at which the power to be supplied to the DC motor is reduced.

2. The motor control device according to claim 1, wherein the controller increases the power to be supplied to the load unit within a range in which the voltage to be supplied by the power source does not exceed a predetermined voltage value during the predetermined period of time.

3. The motor control device according to claim 1,
    wherein the load unit is a stepping motor, and
    wherein the controller supplies the power to the stepping motor with the power increased not to change the position of the stepping motor when the stepping motor is not driven during the predetermined period of time.

4. An electronic apparatus comprising:
    the motor control device according to claim 1.

5. An imaging apparatus comprising:
a first lens and a second lens;
an imaging unit configured to capture a subject image incident through the first lens and the second lens to output image data;
a DC motor configured to drive the first lens;
a stepping motor configured to drive the second lens;
a power source configured to supply power to each of the DC motor and the stepping motor; and
a controller configured to control power supply to the DC motor and the stepping motor, wherein
when reducing the power to be supplied to the DC motor, the controller increases the power to be supplied to the stepping motor during a predetermined period of time which starts before a timing at which the power to be supplied to the DC motor is reduced and ends after the timing at which the power to be supplied to the DC motor is reduced.

* * * * *